(12) United States Patent
Lewis

(10) Patent No.: US 6,893,076 B1
(45) Date of Patent: May 17, 2005

(54) METHOD AND SYSTEM FOR LIGHTWEIGHT FULL-SPAN FLATBED TRUCK PLATFORM

(75) Inventor: John Joseph Lewis, San Jose, CA (US)

(73) Assignee: Mission Valley Ford Truck Sales, Inc., San Jose, CA (US)

( * ) Notice: Subject to any disclaimer, the term of this patent is extended or adjusted under 35 U.S.C. 154(b) by 0 days.

(21) Appl. No.: 10/247,937

(22) Filed: Sep. 19, 2002

(51) Int. Cl.[7] .......................... B62D 25/20; B62D 33/02
(52) U.S. Cl. ................. 296/184.1; 296/29; 296/193.07
(58) Field of Search ................................ 296/181, 182, 296/183, 191, 184.1, 193.07, 187.08; 280/789; 105/422

(56) References Cited

U.S. PATENT DOCUMENTS

| | | | | |
|---|---|---|---|---|
| 1,806,428 A | * | 5/1931 | Travis, Jr. .................. | 296/183 |
| 2,508,674 A | * | 5/1950 | Jolly ........................ | 296/184.1 |
| 2,639,187 A | * | 5/1953 | Grumbache ................ | 296/37.6 |
| 3,068,038 A | * | 12/1962 | Douglass, Jr. ............. | 296/24.1 |
| 3,185,519 A | * | 5/1965 | Turnbull et al. ........... | 296/182 |
| 3,195,477 A | * | 7/1965 | Jones et al. ................ | 105/422 |
| 4,288,957 A | * | 9/1981 | Meehan ..................... | 52/460 |
| 4,534,589 A | * | 8/1985 | Booher ...................... | 296/182 |
| 5,188,418 A | * | 2/1993 | Walworth, Jr. et al. ..... | 296/183 |
| 5,403,063 A | * | 4/1995 | Sjostedt et al. ............ | 296/187 |
| 5,730,485 A | * | 3/1998 | Sjostedt et al. ............ | 296/182 |
| 5,863,091 A | * | 1/1999 | Shepherd et al. .......... | 296/204 |
| 6,247,747 B1 | * | 6/2001 | Kawanomoto et al. ..... | 296/191 |
| 6,523,883 B1 | * | 2/2003 | Bergstrom et al. ........ | 296/184.1 |

FOREIGN PATENT DOCUMENTS

GB       2200600 A   *   8/1988

* cited by examiner

Primary Examiner—D. Glenn Dayoan
Assistant Examiner—Greg Blankenship
(74) Attorney, Agent, or Firm—Sawyer Law Group LLP

(57) ABSTRACT

A truck flatbed platform is disclosed. The truck flatbed platform comprises a frame structure and a corrugated metal member within the frame structure. A full-span truck flat bed platform designed and constructed in accordance with the present invention has increased load-bearing capacity, is lighter in weight, and requires less welding and less labor expenditure than that needed for the construction of conventional ladder-type flatbed platforms.

11 Claims, 5 Drawing Sheets

METHOD AND SYSTEM FOR LIGHTWEIGHT FULL-SPAN FLATBED TRUCK PLATFORM

FIELD OF THE INVENTION

The present invention relates generally to a platform and more specifically to a full-span flatbed truck platform.

BACKGROUND OF THE INVENTION

Current designs for constructing truck flatbed platforms utilize a "ladder type" frame 100, as illustrated in FIG. 1. In the conventional ladder type of platform construction, individual members 102a–n of the steel frame 100 are located beneath the flatbed platform (not shown). All frame members 102a–n must be welded in place in order adequately to support the platform. Accordingly, this adds significant complexity and time in producing the platforms. In addition, these types of platforms are typically heavy to provide the appropriate load bearing capabilities.

Accordingly, what is needed is a system and method for reducing the amount of welding labor required to construct a full-span truck flatbed platform as well as reducing the weight of such platforms. The present invention addresses such a need.

SUMMARY OF THE INVENTION

A truck flatbed platform is disclosed. The truck flatbed platform comprises a frame structure and a corrugated metal member within the frame structure. A full-span truck flat bed platform designed and constructed in accordance with the present invention has increased load-bearing capacity, is lighter in weight, and requires less welding and less labor expenditure than that needed for the construction of conventional ladder-type flatbed platforms.

DETAILED DESCRIPTION

The present invention relates generally to a full-span flatbed truck platform and more specifically to a corrugated lightweight steel metal member supported by a frame requiring no welding of the corrugated metal member. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for a flatbed truck platform. The flatbed truck platform includes a frame structure and a corrugated steel member within the frame structure. In so doing, the number of weld points on the frame structure is minimized and a lightweight platform is provided. A full-span truck flatbed platform designed in accordance with the present invention utilizes a corrugated lightweight metal member which serves as the primary load bearing structure.

Implementation

Figure 2:
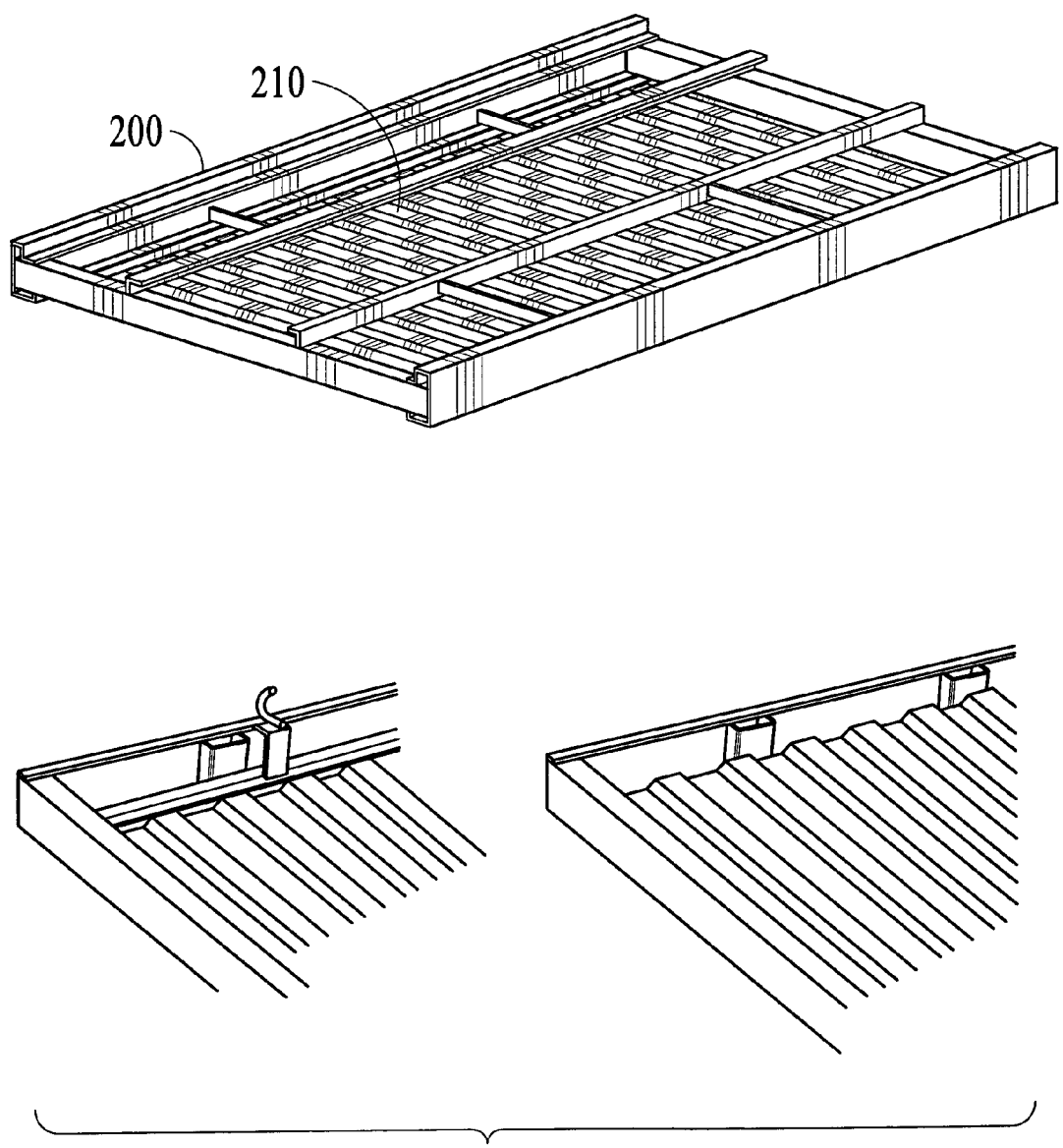
FIG. 2 is a perspective view of the frame structure which surrounds and contains the corrugated metal member of the present invention.
Figure 3:
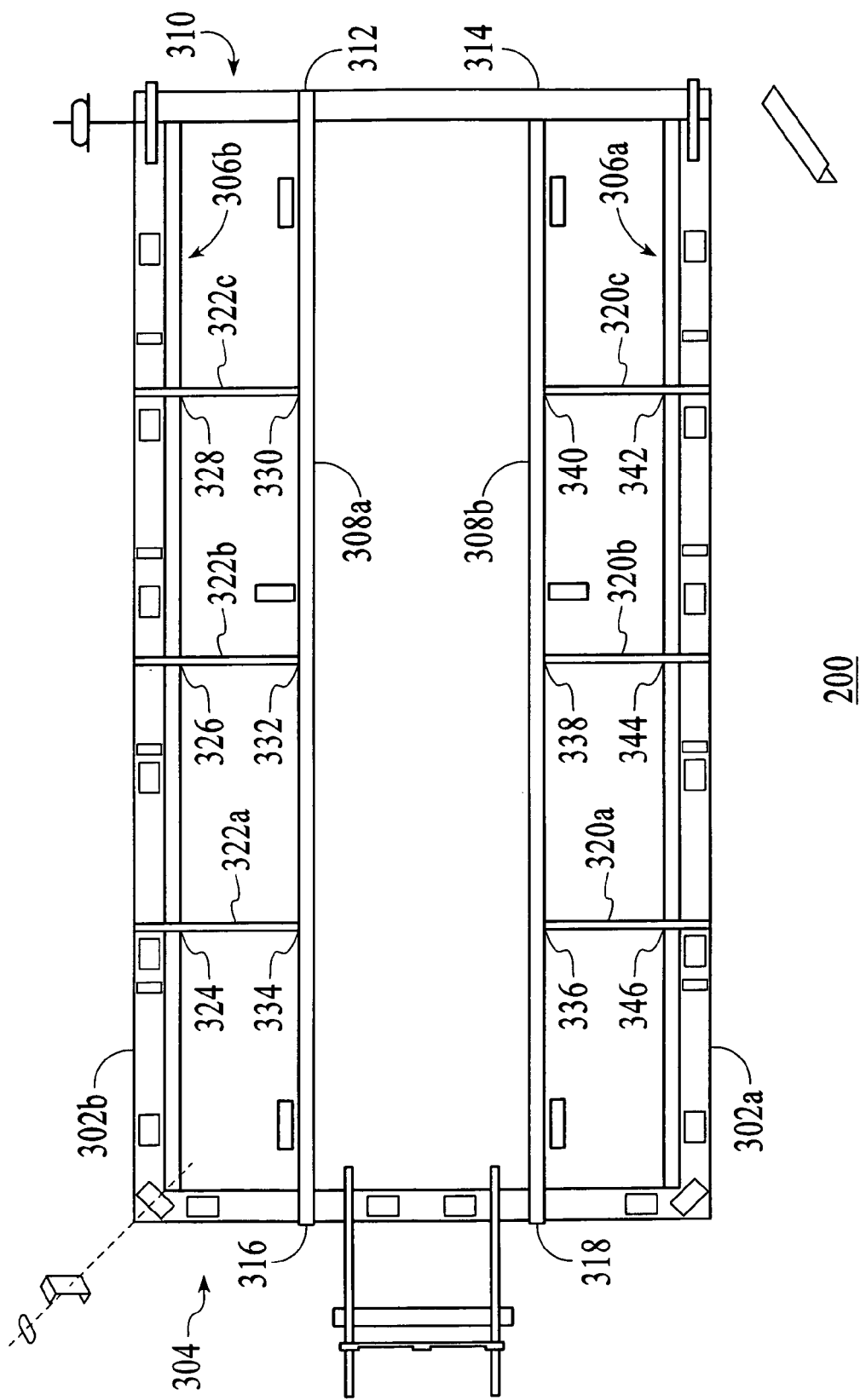
FIG. 3 illustrates a top view of the supporting frame structure which holds the corrugated metal member in accordance with the present invention.

FIG. 2 is a perspective view of the frame structure 200 which surrounds and contains the corrugated metal member 210 of the present invention. FIG. 3 is a top view of the design and construction of the frame structure 200 which surrounds and contains the corrugated metal member in accordance with the present invention. In a preferred embodiment, the frame structure 200 which is rectangular comprises two side rails 302a–302b; a first flanged end rail 304 which is perpendicular to the two rails at one end thereof; and a flanged cross member 310 which is parallel to the first flanged end rail 304 at an opposite end of the side rails 302a and 302b. The first and second flange member as is seen in FIG. 2 contains the corrugated metal member 210. Lower pan supports 306a–306b are welded to the side rails 302a–302b.

The frame structure 200 further includes two steel beams 308a–308b which extend lengthwise from the end rail 304 to the single flanged cross member 310. The steel beams 308a–308b are welded to the single flanged cross member 310 at points 312 and 314, and to the flanged end rail 304 at points 316 and 318. Three lateral supports 322a–322c extend from one side rail 302b to one steel beam 308b. The lateral supports 322a–322c are welded to the side rail 302b and to the steel beam at points 324, 326, 328, 330, 332 and 334. Three additional lateral supports 320a–320c extend from side rail 302a to steel beam 308a. Lateral supports 320a–320c are welded to side rail 302a and to steel beam 308a at points 336, 338, 340, 342, 344, 346.

Figure 1:
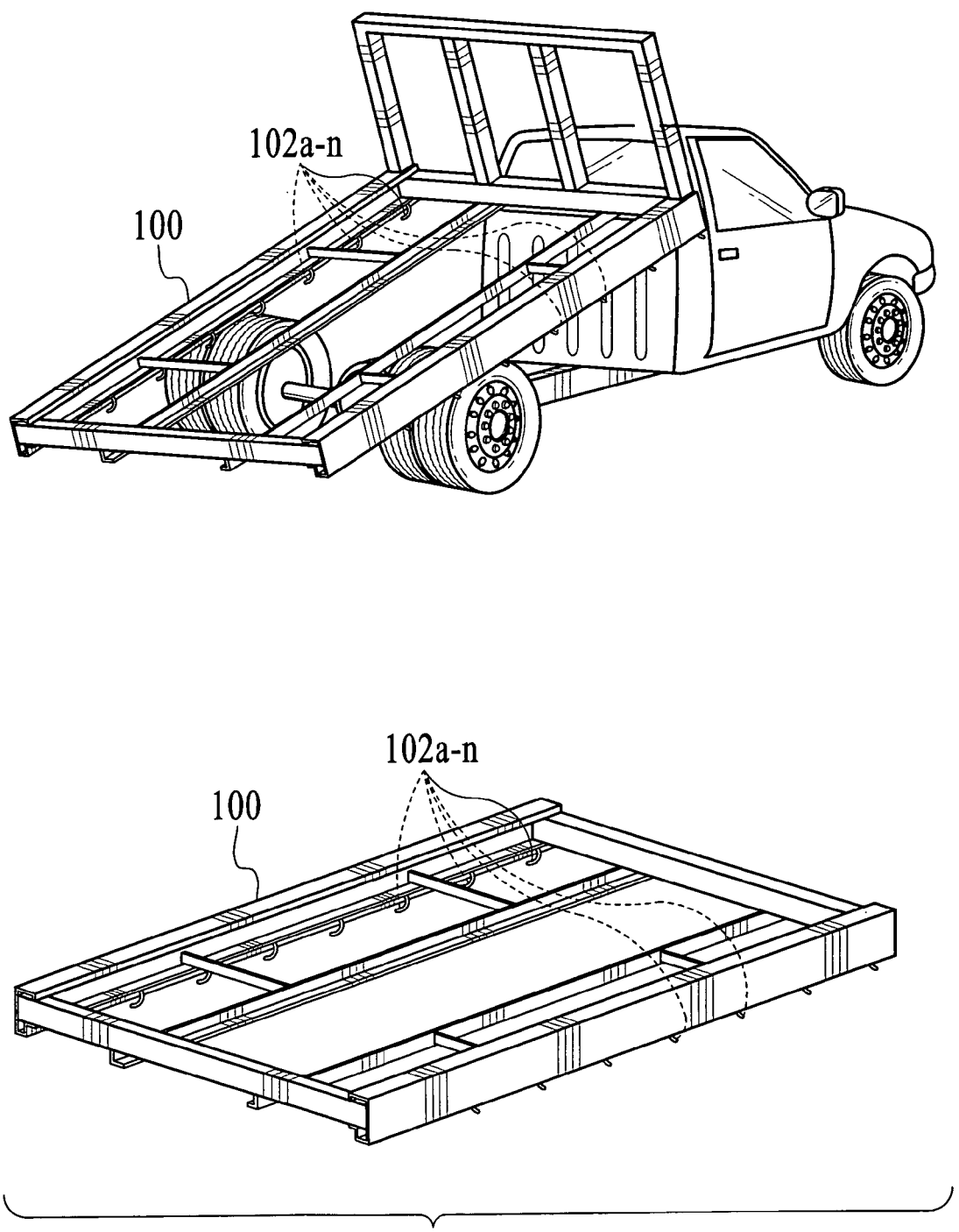
FIG. 1 illustrates a conventional design for a full-span truck flatbed platform.

The corrugated metal member is supported and held in place from beneath by the frame structure 200. Whereas prior art designs require all members of the conventional frame structure 100 (see FIG. 1) to be welded in place, the design and construction in accordance with the present invention requires no welding of the corrugated metal member directly to the stamped frame structure 200. Because the corrugated metal member in accordance with the present invention provides greater load-bearing area than a conventional stamped frame structure, welding on fewer points is required on the frame structure 200. Welding is required on members of the frame structure 200 only at points 324, 326, 328, 330, 332, 334, 336, 338, 340, 342, 344 and 346, thereby reducing welding labor by 80 percent in comparison to the amount of welding required when utilizing conventional design and construction methods.

Lateral main frame members 320a–c and 322a–c, spanning fore to aft under the corrugated metal member, transfer the load to the truck chassis and also serve as a shear mounting device. The load bearing area against the lateral frame 200 using the corrugated metal member method in accordance with the present invention provides an increase of 300 percent of load bearing capacity over the conventional ladder frame construction with 16" center cross members and a 245 percent increase of load bearing capacity over conventional ladder frame construction with 12" center cross members.

Figure 4:
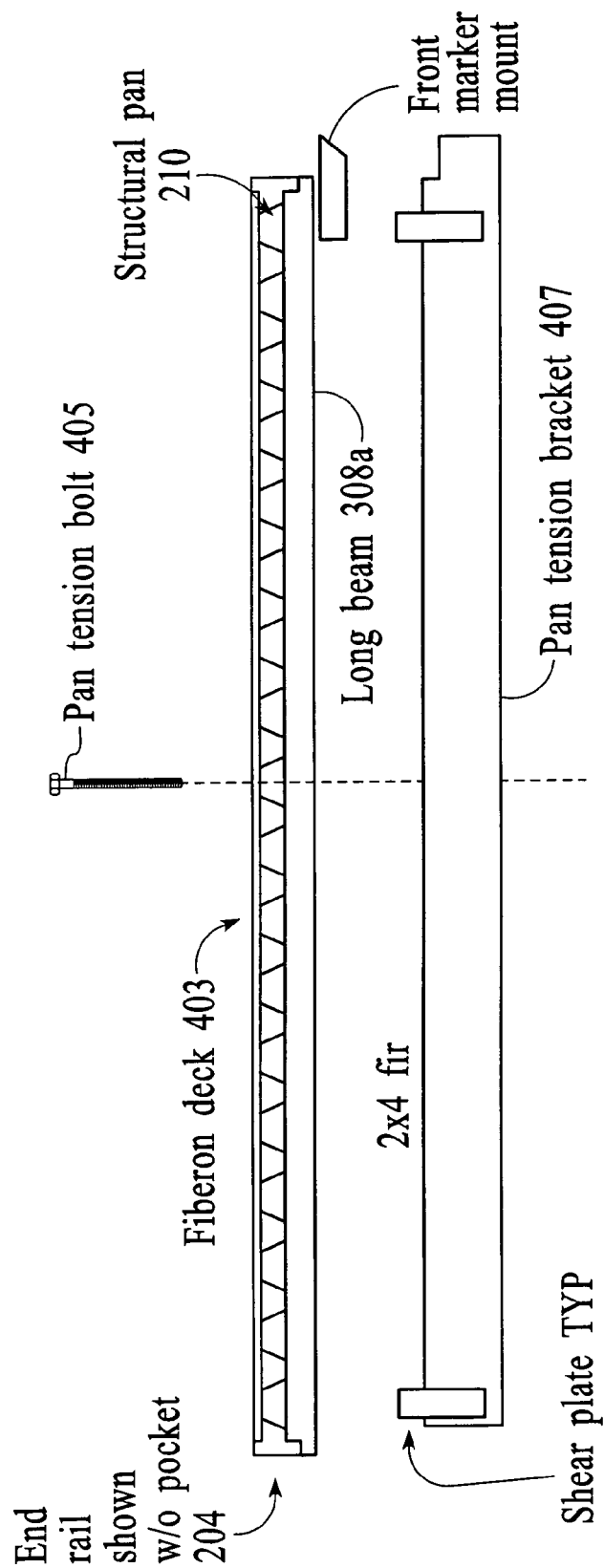
FIG. 4 illustrates a side view of the supporting frame structure in accordance with the present invention.

FIG. 4 illustrates a side view of the corrugated metal member 210 in accordance with the present invention. The steel long beam 308a supports the corrugated metal member 210. The end rail 204 supports and holds in the corrugated metal member from one end. A fiberon deck 403 rests on top of the corrugated metal member 210. The pan tension bolt 405 fastens to the pan tension bracket 407. The pan tension bolt 405 holds the corrugated metal member 401 and the fiberon deck 403 in place.

Figure 5:
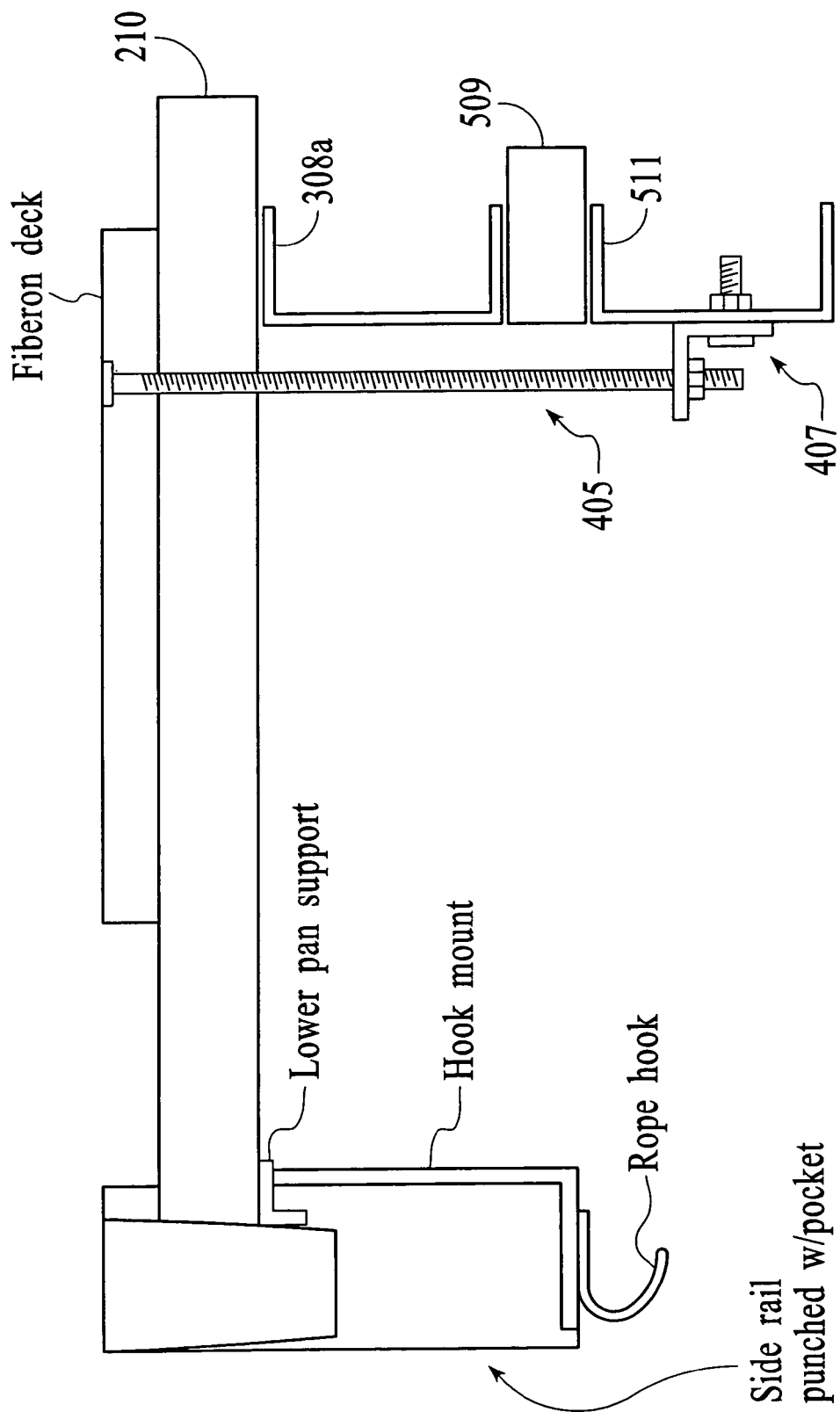
FIG. 5 illustrates a side view showing the function of the pan tension bolt as it fastens to the pan tension bracket.

FIG. 5 illustrates a side view showing the function of the pan tension bolt 405 as it fastens to the pan tension bracket 407. In this figure, the corrugated metal member 210 is supported by the steel beam 308a, resting upon a beam (preferably a 2×4 fir beam) 509 which then rests upon the truck chassis 511. The corrugated metal member method in accordance with the present invention is 35% lighter than the conventional ladder construction method with 16" cross members.

A full-span truck flat bed platform designed and constructed in accordance with the present invention therefore has increased load-bearing capacity, is lighter in weight, and requires less welding and therefore less labor expenditure than that needed for the construction of conventional ladder-type flatbed platforms.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:
1. A truck flatbed platform comprising:
a frame structure;
a corrugated structure within the frame structure, wherein the corrugated structure is substantially trapezoidal; and
a deck coupled on top of the corrugated structure, wherein the deck is substantially flat, and wherein the deck overlays a substantial portion of the top of the corrugated structure.

2. The truck flatbed platform of claim 1 wherein the frame structure comprises:
a rectangular structure; and
a plurality of support members coupled within the rectangular structure wherein welding of the frame structure is minimized.

3. The truck flatbed platform of claim 2 wherein the number of load bearing points on the platform is maximized.

4. The truck flatbed platform of claim 2 wherein the frame structure comprises:
two parallel side rails, and a first end rail perpendicular to the two side rails at one end thereof; and
a second end rail parallel to the first end rail and at an opposite end of the two side rails, wherein the first and second end rails contain the corrugated structure.

5. The truck flatbed platform of claim 4 wherein the plurality of support members comprises:
first and second beams which are coupled to the first and second end rails, the first and second beams being parallel to and inside each of the first and second side rails; and
a plurality of lateral support members coupled between the first beam and the first side rail and the second beam and the second side rail.

6. A truck flatbed platform comprising:
a frame structure, wherein the frame structure comprises a rectangular structure and a plurality of support members coupled within the rectangular structure;
a corrugated structure within the frame structure, wherein the corrugated structure is substantially trapezoidal, wherein welding of the frame structure is minimized; and wherein the number of load bearing points on the platform is maximized; and
a deck coupled on top of the corrugated structure, wherein the deck is substantially flat, and wherein the deck overlays a substantial portion of the top of the corrugated structure.

7. The truck flatbed platform of claim 6 wherein the frame structure comprises:
two parallel side rails, and a first end rail perpendicular to the two side rails at one end thereof; and
a second end rail parallel to the first end rail and at an opposite end of the two side rails, wherein the first and second end rails contain the corrugated structure.

8. The truck flatbed platform of claim 7 wherein the plurality of support members comprises:
first and second beams which are coupled to the first and second end rails, the first and second beams being parallel to and inside each of the first and second side rails; and
a plurality of lateral support members coupled between the first beam and the first side rail and the second beam and the second side rail.

9. A truck flatbed platform comprising:
a frame structure, wherein the frame structure comprises two parallel side rails, and a first end rail perpendicular to the two side rails at one end thereof; and a second end rail parallel to the first end rail and at an opposite end of the two side rails, wherein the first and second end rails contain a plurality of support members;
a corrugated structure within the frame structure, wherein the corrugated structure is substantially trapezoidal; and
a deck coupled on top of the corrugated structure, wherein the deck is substantially flat, and wherein the deck overlays a substantial portion of the top of the corrugated structure.

10. The truck flatbed platform of claim 9 wherein the plurality of support members comprises:
first and second beams which are coupled to the first and second end rails, the first and second beams being parallel to and inside each of the first and second side rails; and
a plurality of lateral support members coupled between the first beam and the first side rail and the second beam and the second side rail.

11. A truck flatbed platform comprising:
a frame structure, wherein the frame structure comprises a two parallel side rails, a first end rail perpendicular to the two side rails at one end thereof; and a second end rail parallel to the first end rail and at an opposite end of the two side rails, wherein the first and second end rails contain a plurality of support members, wherein the plurality of support members comprises first and second beams which are coupled to the first and second end rails, the first and second beams being parallel to and inside each of the first and second side rails; and a plurality of lateral support members coupled between the first beam and the first side rail and the second beam and the second side rail;

a corrugated structure within the frame structure wherein the corrugated structure is substantially trapezoidal; and a deck coupled on top of the corrugated structure, wherein the deck is substantially flat, and wherein the deck overlays a substantial portion of the top of the corrugated structure.

* * * * *